United States Patent
Boot et al.

(10) Patent No.: US 9,444,955 B2
(45) Date of Patent: *Sep. 13, 2016

(54) METHOD OF CREATING A LABEL, A PRINTING APPARATUS, AND A COMPUTER-READABLE MEDIUM

(71) Applicant: SANFORD L.P., Downers Grove, IL (US)

(72) Inventors: Bram Boot, Borgerhout (BE); Stephen Charles Gohde, Atlanta, GA (US); Stephen Spencer, Atlanta, GA (US); Stefaan Van Den Broecke, Kalamazoo, MI (US)

(73) Assignee: SANFORD L.P., Downers Grove, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,765

(22) Filed: Oct. 6, 2015

(65) Prior Publication Data

US 2016/0150106 A1 May 26, 2016

Related U.S. Application Data

(63) Continuation of application No. 13/529,845, filed on Jun. 21, 2012, now Pat. No. 9,185,249.

(51) Int. Cl.
*G06K 1/00* (2006.01)
*H04N 1/00* (2006.01)
(Continued)

(52) U.S. Cl.
CPC ......... *H04N 1/00411* (2013.01); *B41J 3/4075* (2013.01); *B41J 3/46* (2013.01);
(Continued)

(58) Field of Classification Search
CPC ... H04N 1/0035; B41J 11/008; B41J 3/4075; B41J 3/46; G06F 3/0482; G06F 3/0488; G06F 3/1243; G06K 15/024; G06K 2017/0083; G06T 2219/004
USPC ...... 358/1.1, 1.6, 1.9, 1.13, 1.14, 1.15, 1.16, 358/1.18; 347/10; 400/76, 78, 613
See application file for complete search history.

(56) References Cited

U.S. PATENT DOCUMENTS 5,677,999 A 10/1997 Hidaka et al.
5,933,589 A 8/1999 Hidaka et al.
(Continued)

FOREIGN PATENT DOCUMENTS

EP 0267890 A2 5/1988
EP 322918 A2 7/1989
(Continued)

OTHER PUBLICATIONS

Office Action in CN Application No. 201380040245.0 dated Nov. 26, 2015, 16 pages.
(Continued)

*Primary Examiner* — Gabriel Garcia
(74) *Attorney, Agent, or Firm* — Marshall, Gerstein & Borun LLP

(57) ABSTRACT

A method of creating a label to be printed on a label printing apparatus comprising: determining at least one option to be made available to a user relating to a label-creating process; displaying said at least one option on a display; and enabling a user to select said at least one option; wherein said determination of the at least one option to be made available to the user is based upon at least one parameter.

20 Claims, 18 Drawing Sheets

(51) Int. Cl.
  *B41J 3/407* (2006.01)
  *B41J 3/46* (2006.01)
  *G06K 15/00* (2006.01)

(52) U.S. Cl.
  CPC ......... *H04N 1/0035* (2013.01); *H04N 1/0044* (2013.01); *H04N 1/00384* (2013.01); *H04N 1/00416* (2013.01); *H04N 2201/0096* (2013.01)

(56) References Cited

U.S. PATENT DOCUMENTS

| | | | |
|---|---|---|---|
| 2003/0077099 A1* | 4/2003 | Tanaka | B41J 3/4075 400/615.2 |
| 2007/0231039 A1 | 10/2007 | Suzuki et al. | |
| 2008/0074697 A1* | 3/2008 | Sawada | B41J 3/01 358/1.15 |
| 2008/0079956 A1 | 4/2008 | Chelvayohan et al. | |
| 2009/0190987 A1 | 7/2009 | Vleurinck et al. | |
| 2010/0328714 A1* | 12/2010 | Allen | G06F 3/04847 358/1.15 |

FOREIGN PATENT DOCUMENTS

| | | |
|---|---|---|
| EP | 322918 B1 | 7/1989 |
| EP | 322919 A2 | 7/1989 |
| EP | 322919 B1 | 7/1989 |
| EP | 578372 A2 | 1/1994 |
| EP | 578372 B1 | 1/1994 |
| EP | 1527890 B1 | 1/2011 |

OTHER PUBLICATIONS

International Search Report for Application No. PCT/US2013/046528, dated Sep. 10, 2013.
Written Opinion of the International Searching Authority for Application No. PCT/US2013/046528, dated Sep. 10, 2013.

\* cited by examiner

METHOD OF CREATING A LABEL, A PRINTING APPARATUS, AND A COMPUTER-READABLE MEDIUM

CROSS-REFERENCE TO RELATED APPLICATION

This application is a continuation of U.S. patent application Ser. No. 13/529,845 filed Jun. 21, 2012, entitled "Method of Creating a Label, a Printing Apparatus, and a Computer-Readable Medium", now U.S. Pat. No. 9,185,249, the entire disclosure of which is incorporated herein by reference.

BACKGROUND OF THE INVENTION

1. Field of the Invention

The present invention relates to a label printer for printing an image onto a label. In particular it relates to a user interface of such a label printer.

2. Related Technology

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

SUMMARY OF THE INVENTION

In one aspect there is provided a method of creating a label to be printed on a label printing apparatus comprising: determining at least one option to be made available to a user relating to a label-creating process; displaying said at least one option on a display; and enabling a user to select said at least one option; wherein said determination of the at least one option to be made available to the user is based upon at least one parameter.

The at least one parameter may comprise a type of cassette inserted in said label printing apparatus.

The at least one parameter may comprise an option previously selected by a user.

The at least one parameter may comprise an object to be labeled.

The at least one parameter may comprises a label type.

The at least one option may relate to at least one feature of the label to be printed.

The feature of the label to be printed may comprise at least one label-type.

The at least one label type may comprise at least one of: a terminal block label; a patch panel label; a flag label, a die-cut label; a fixed-length label; a 110-block label; a cable wrap label, a heat-shrink tubing label; and a self-laminating cable label.

The determining at least one option to be made available to a user may comprise only providing options that are applicable to the selected label-type.

The options that are determined not to be available to the user may not be displayed to the user.

The options that are determined not to be available to the user may be displayed in a different manner to those options that are made available to the user.

The at least one option may relate to features of an object to which the label is to be applied.

The at least one option to be made available to a user may comprise at least one direct access key.

The at least one option made available to the user may comprise an editable property of the label to be created or of the object to which the label is to be applied.

The user may be prompted to enter a value for said editable property.

In another aspect there is provided a method of creating a label to be printed on a label printing apparatus comprising:

determining at least one option relating to a label-creating process to be made available to a user, said determining at least one option dependent upon a type of image receiving medium in said label printing apparatus; displaying said at least one option on a display; and enabling a user to select said at least one option; and following selection of said at least one option determining at least one further option relating to the label-creating process to be made available to the user; and modifying said display to display said at least one further option.

In another aspect there is provided an apparatus comprising: means for determining at least one option to be made available to a user relating to a label-creating process; means for displaying said at least one option; and means for enabling a user to select said at least one option; wherein said determination of the at least one option to be made available to the user is based upon at least one parameter.

In another aspect there is provided an apparatus comprising:

at least one processor; and at least one memory; the at least one processor and the at least one memory arranged to cause the apparatus at least to determine at least one option to be made available to a user relating to a label-creating process;

display said at least one option on a display; enable a user to select said at least one option; wherein said determination of the at least one option to be made available to the user is based upon at least one parameter.

In another aspect there is provided an apparatus comprising:

means for determining at least one option relating to a label-creating process to be made available to a user, said determining at least one option dependent upon a type of image receiving medium in said label printing apparatus; means for displaying said at least one option; means for enabling a user to select said at least one option; and following selection of said at least one option said apparatus arranged to determine at least one further option relating to the label-creating process to be made available to the user; and said apparatus arranged to modify said display to display said at least one further option.

In another aspect there is provided an apparatus comprising: at least one processor; and at least one memory; the at least one processor and the at least one memory arranged to cause the apparatus at least to determine at least one option relating to a label-creating process to be made available to a user, said determining at least one option dependent upon a type of image receiving medium in said label printing apparatus; display said at least one option on a display;

enable a user to select said at least one option; and following selection of said at least one option determine at least one further option relating to the label-creating process to be made available to the user; and modify said display to display said at least one further option.

In another aspect there is provided a computer program comprising computer program code means adapted to perform the methods defined above when said program is run on a computer.

BRIEF DESCRIPTION OF THE DRAWINGS

Some embodiments will now be described by way of example only with reference to the accompanying figures in which.

DETAILED DESCRIPTION

Figure 1:
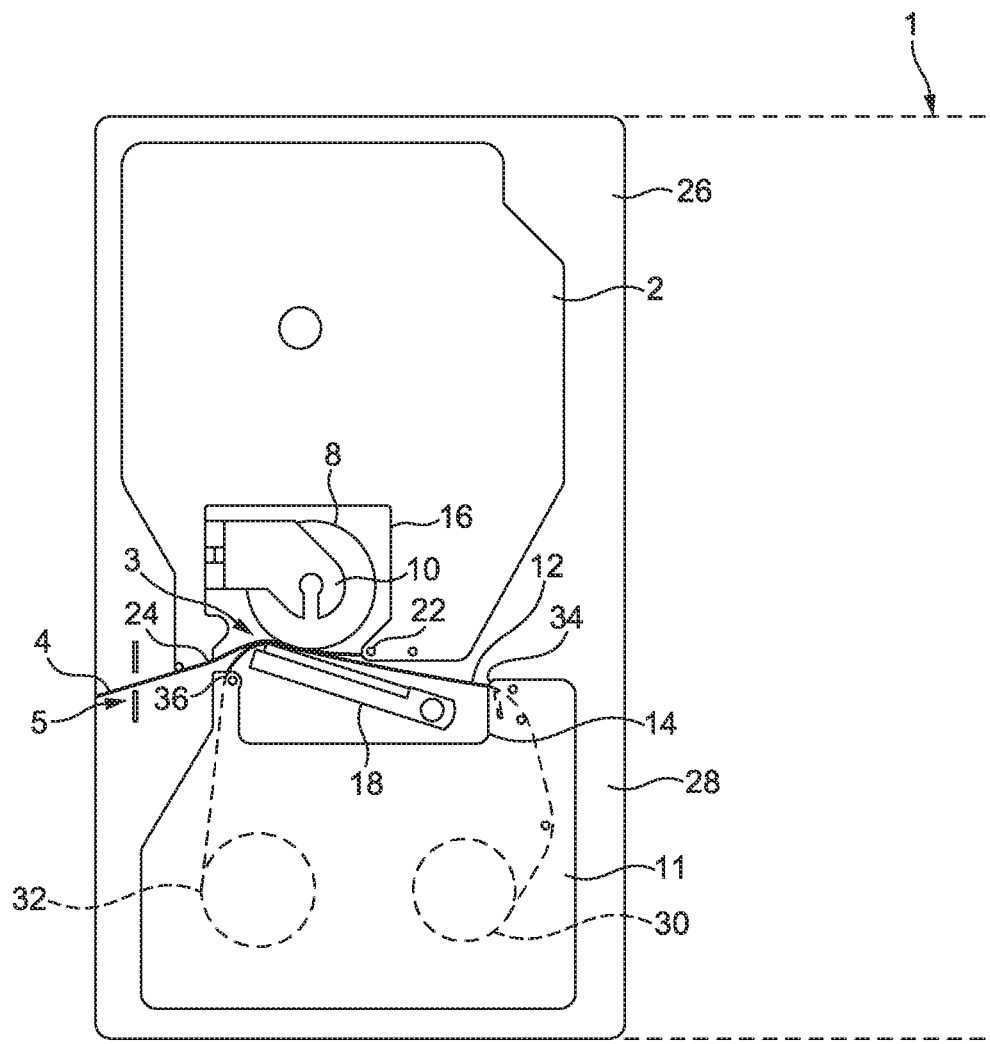
FIG. 1 shows certain parts of one type of label printer.

FIG. 1 shows in plan view a first label printer which has two cassettes arranged therein. Typically, this label printer 1 is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage molding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8 in an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
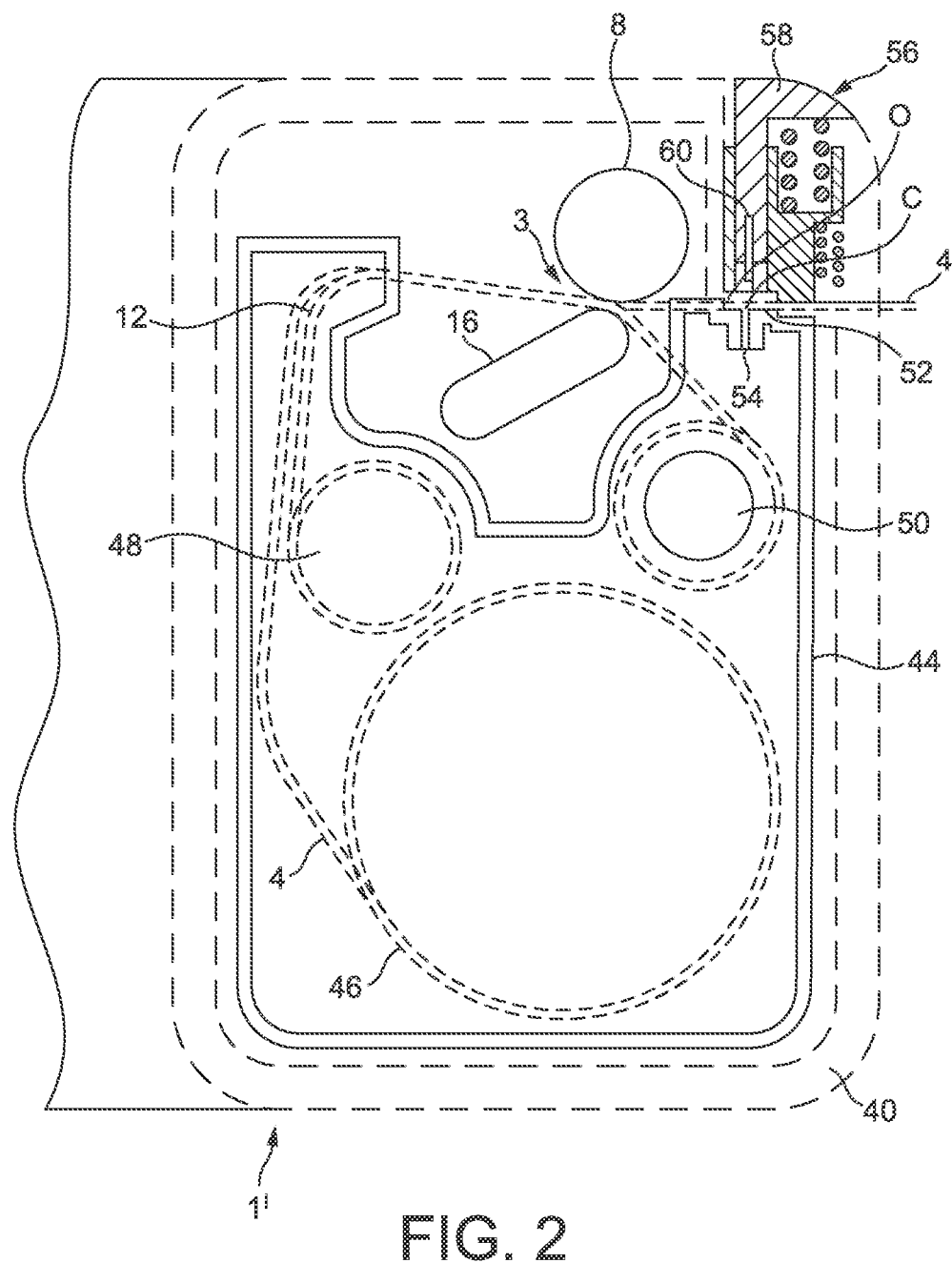
FIG. 2 shows certain parts of another type of label printer.

FIG. 2 illustrates in plan view a cassette bay of a second label printer 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. Alternatively the platen is pivotable so that it can be brought into contact with the printhead for printing and moved away from the printhead to enable the cassette to be inserted. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the print zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' may act as stand-alone printing devices including a controller for receiving inputs from a user and to alter what is displayed on a display of the printing devices. Furthermore, the label printers 1 and 1' may also be connectable or connected to a PC, in which case the PC also includes a controller to receive inputs from a user and to alter what is displayed on a display of the printer or of the PC.

Figure 3:
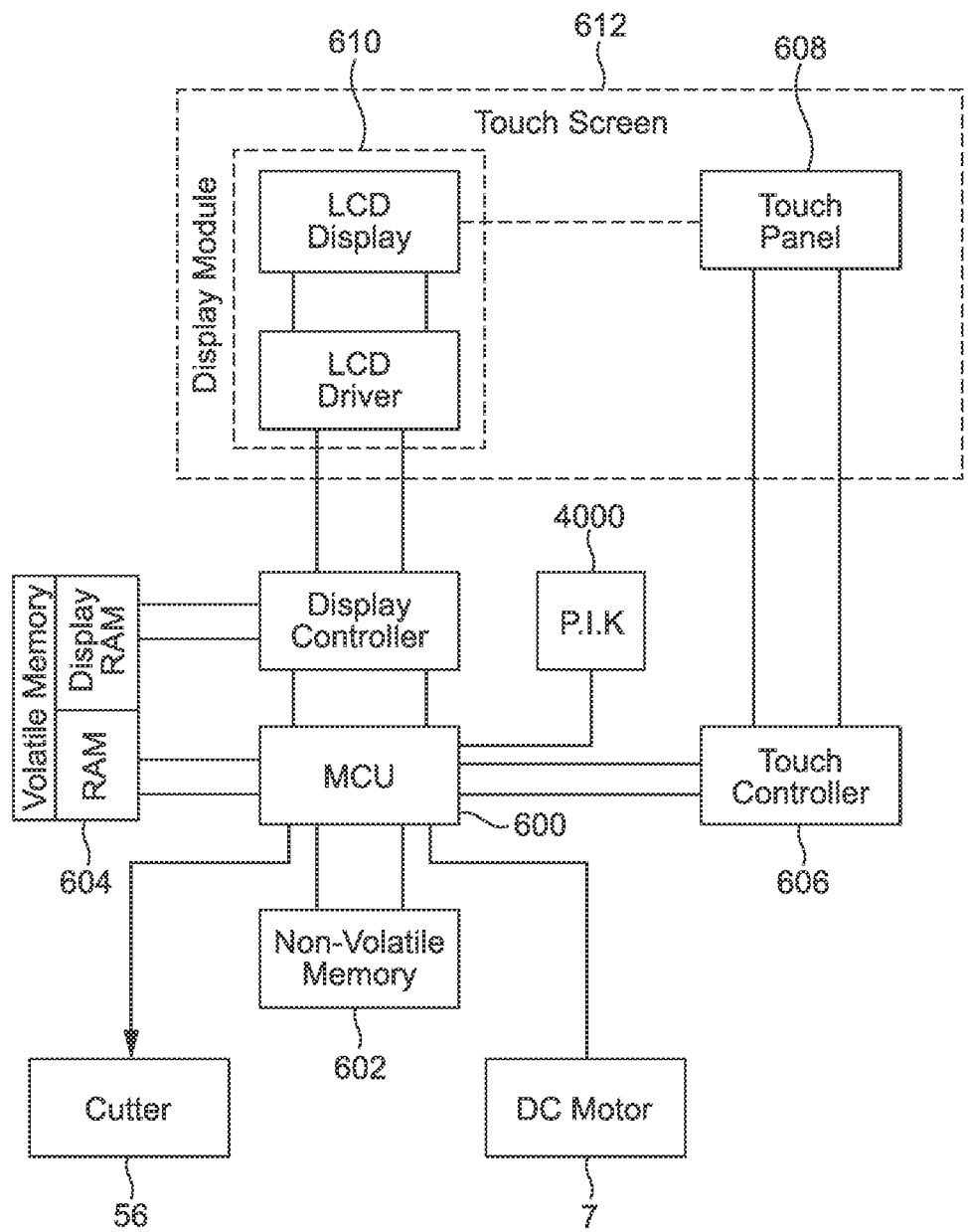
FIG. 3 is a schematic diagram showing certain parts of a label printer.

Basic circuitry for controlling the label printer 1 of FIG. 1 or the label printer 1' of FIG. 2 is shown in FIG. 3. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprises one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

It should also be understood that where the label printer 1 or 1' is connected to an external apparatus such as a PC, then the PC also contains similar components such as at least one memory and at least one processor to enable the PC to carry out the operations of creating a label to be printed. Such a PC will also be connected to a display means such as a monitor.

Hereafter it should be understood that labels may be created on either or both of the label printing apparatus itself or on an external apparatus such as a PC connected to the label printer. Accordingly, it shall be understood that hereafter terms such as "memory", "processor" and "display" may refer to these components on either or both of a label printing apparatus and a PC.

Figure 4:
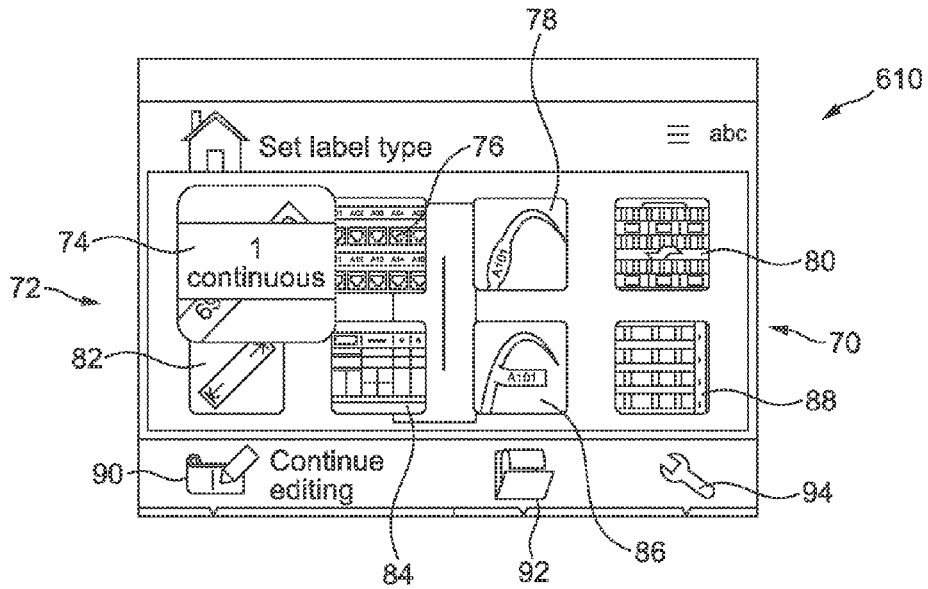
FIG. 4 shows a graphical control panel according to an embodiment.

A user interface according to an exemplary embodiment will now be described. FIG. 4 shows a user interface 70 displayed on display 610. In FIG. 4 a user is presented with a graphical control panel 72 which enables the user to select a label type. In this example the user has selected a 1 inch continuous label type 74, and accordingly this icon has been enlarged to demonstrate to the user that this option is selected.

Other options available to the user via this graphical control panel 72 include patch panel label type 76, cable wrap label type 78, 110-block label type 80, fixed length label type 82, module label type 84, flag label type 86, and breaker label type 88.

At the bottom of the display the user can also select a further option to continue editing 90, to open a folder 92 (from where saved labels can be selected for example), and a settings menu 94 from where printer settings can be adjusted.

Figure 5:
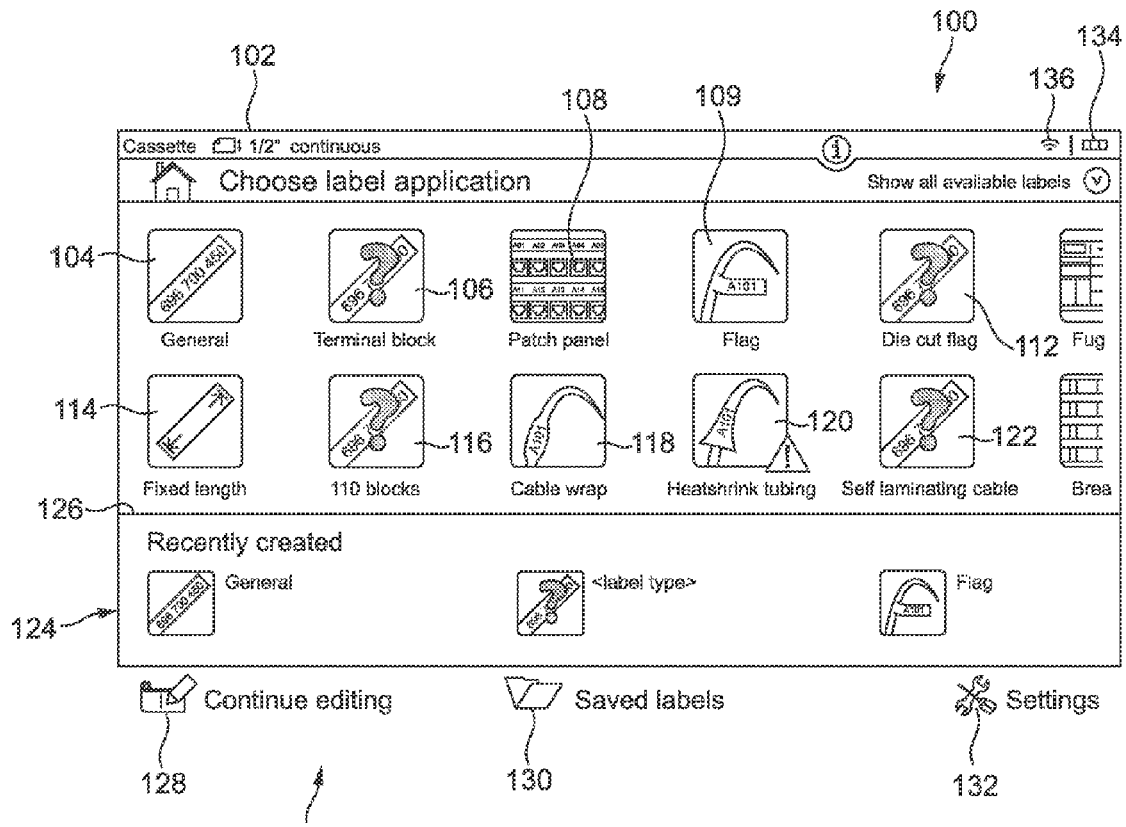
FIG. 5 shows a graphical control panel according to an embodiment.

FIG. 5 shows an exemplary graphical user interface 100 in a further embodiment. In this embodiment it has been detected that a user has inserted a tape cassette containing continuous tape of 0.5" width, as displayed in region 102 of display 610. The graphical user interface 100 displays all types of labels that are available to the user for a cassette of this width. The options available to a user via menu 100 include a general label type 104, a terminal block label type 106, a patch panel label type 108, a flag label type 109, a die-cut flag label type 112, a fixed length label type 114, a 110-block label type 116, a cable wrap label type 118, a heat shrink tubing label type 120, and a self-laminating cable label type 122.

More or less than these types of label may be provided. Additionally or alternatively different types of label may be available.

Additional or alternative types of label comprise one or more of a fuse box label type, a quick label type, a breaker box label type, a distribution panel label type, and a module type.

In FIG. 5 the heat shrink tubing label type 120 is shown with an exclamation mark 121. This exclamation mark 121 indicates to the user that such a label cannot be properly printed with the presently inserted cassette. Additionally or alternatively the label type may be shown with a different appearance. For example the unavailable label types may be "greyed" or "shaded".

The user is thus automatically presented with the label types that are available for the particular type of cassette that has been inserted into the printer. This reduces the number of key strokes required for a user to select a suitable label, and also prevents a user from attempting to create a label type that is unsuitable for the type of cassette inserted.

The graphical user interface 100 also includes a region 124 from which a user can select recently created labels. This portion of the menu is separated from the rest of the menu area by a divider line 126.

In another embodiment (not shown) this region 124 may be omitted.

Via this graphical user interface 100 the user can also select to continue editing by selecting icon 128, to open a saved labels folder using icon 130, or to enter a settings menu using icon 132.

The display also shows a battery power level 134, and also the strength of wireless connection 136 for embodiments where the printer is connected to a wireless network.

Figure 6:
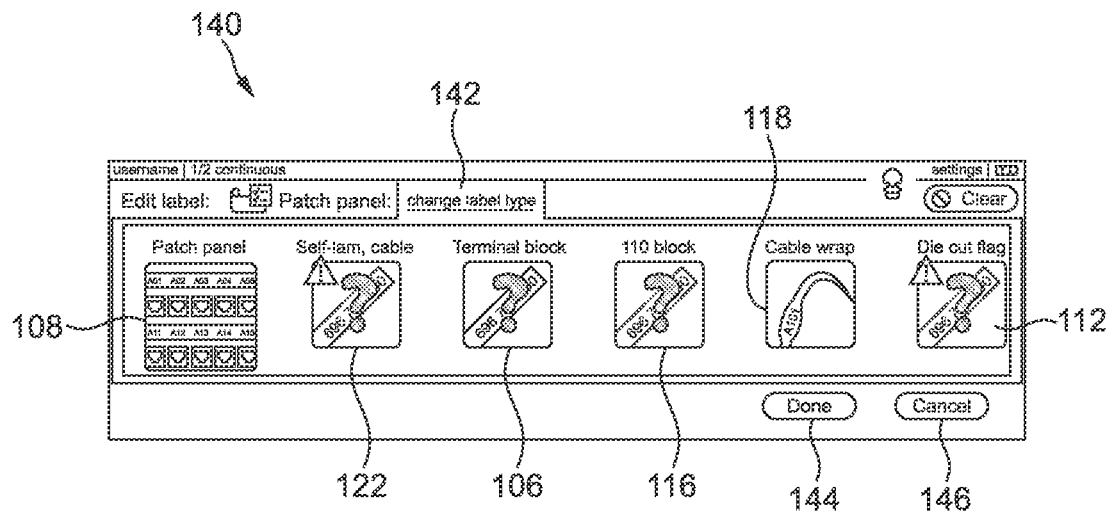
FIG. 6 shows a graphical control panel according to an embodiment.

A further graphical user interface 140 is shown in FIG. 6. This interface may be reached for example by going to the "home" screen. The user has selected on the graphical control panel of FIG. 5 the patch panel icon 108 so as to create a label for a patch panel. In FIG. 6 the user has clicked on the "change label type" tab 142 which has thus presented to the user other label types that are available to the user; in this case self-laminating cable label type 122, terminal block label type 106, 110-block label type 116, cable wrap label type 118 and die cut flag label type 112. Once the user has changed the label type they can confirm this selection by clicking on the "Done" button 144, or they can exit the menu screen 140 by clicking on "Cancel" button 146.

As shown in FIG. 6 the self-laminating cable type icon 122 and the die-cut flag label type icon 112 have an exclamation mark partially covering their respective icons. These exclamation marks indicate to the user that such a label cannot be properly printed with the presently inserted cassette.

An exemplary process for the creation of a patch panel label is shown in FIGS. 7 to 17.

Figure 7:
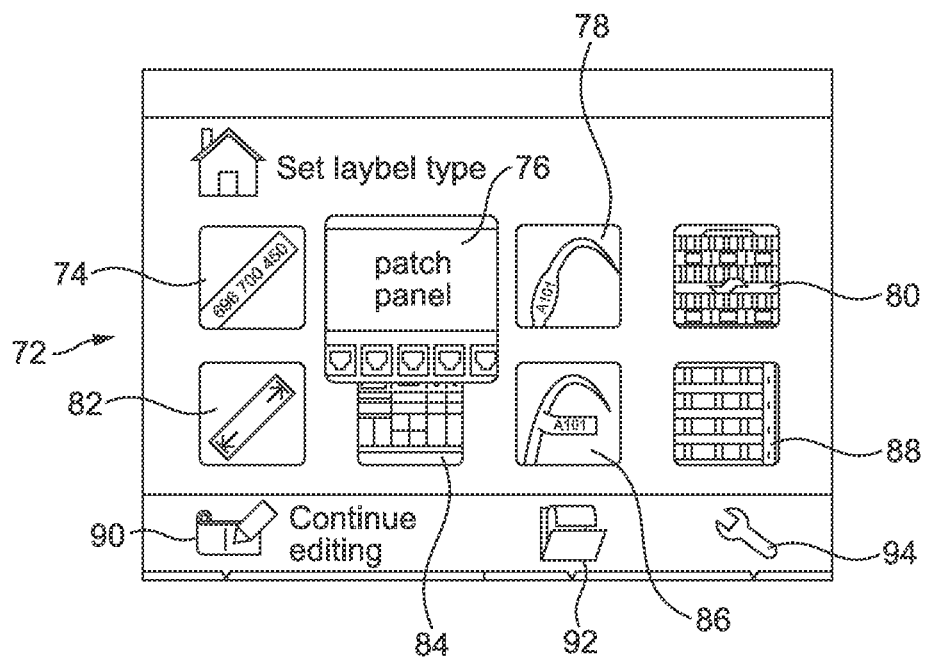
FIG. 7 shows a graphical control panel according to an embodiment.

FIG. 7 shows a graphical user interface with the same graphical control panel 72 as FIG. 4. However, in FIG. 7, the user has selected the patch panel icon 76 so as to create a label for a patch panel.

FIGS. 8 to 17 show a user interface flow in the creation of a patch panel, according to one embodiment.

Figure 8:
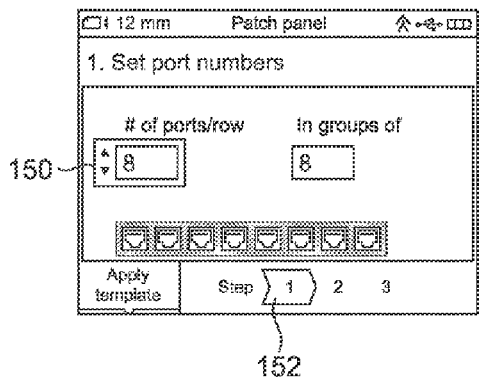
FIGS. 8 to 17 show a user interface flow for the creation of a patch panel, according to one embodiment.

As shown in FIG. 8, at the first step the user may enter the number of ports/rows of the patch panel at region 150 of the display by selecting a number on the keyboard. The user can also increase and decrease the number of ports/rows using the up and down arrows. Region 150 is highlighted to enable the user to change or confirm this parameter. Region 152 of the display also displays to the user that the user is at step 1 of 4 of the process.

Figure 9:
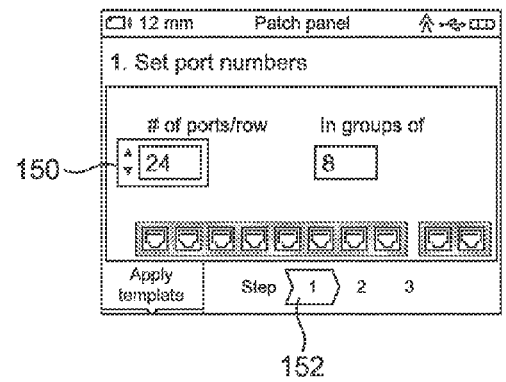

In FIG. 9 it is shown that the user has increased the number of ports/rows to 24. Region 152 shows that the user is still at step 1 i.e. setting the port numbers.

Figure 10:
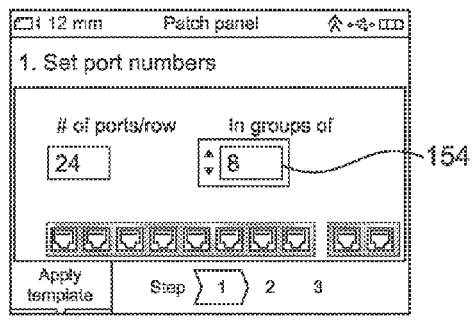

In FIG. 10 it is shown that the user can set the port/row groupings i.e. how many ports there are in each group. This is shown at region 154 of the display. Again the user can increase or decrease this number using the up and down arrows. As shown in FIG. 10 there are currently 24 ports/row grouped in groups of 8 ports.

Figure 11:
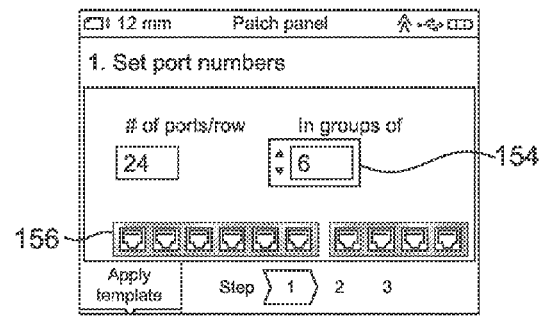

As shown in FIG. 11 the user has decreased the number of ports per group to 6. This is also displayed at region 156 where 6 ports can clearly be seen in the group.

Figure 12:
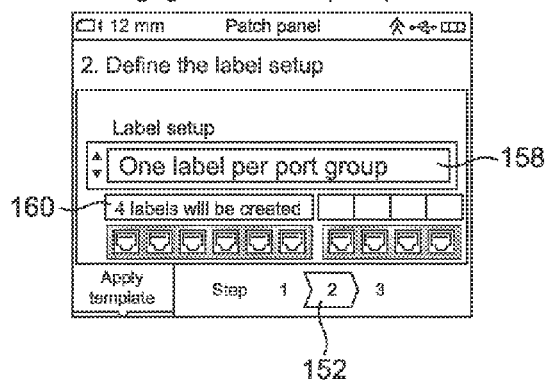

In FIG. 12 the user is shown to now be at step 2 in the patch panel creation process as shown by region 152 of the display. At this step the user defines the label setup. At region 158 of the display the user can scroll through label setup options again using the up and down arrows. In FIG. 12 the user has currently selected "1 label per port group". As shown at 160 this will result in 4 labels being created.

Figure 13:
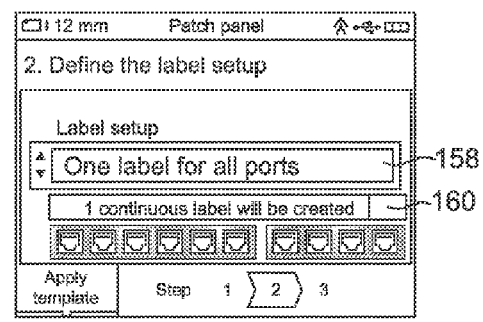

In FIG. 13 the user has scrolled through the options to now select "one label for all ports". As shown at 160 this will result in one continuous label being created.

Figure 14:
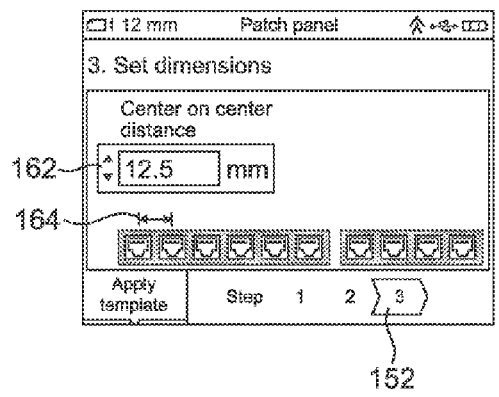

FIG. 14 shows that the user is now at step 3 of the patch panel label creation process. At this step the user should set dimensions of the patch panel. At region 162 of the display the user can change the center-on-center distance of the label ports using for example the up and down arrows. The meaning of "center-on-center distance" is clearly shown at region 164 of the display as being the distance between the center of consecutive ports. That is the display provides a visual aim of the parameter being modified.

Figure 15:
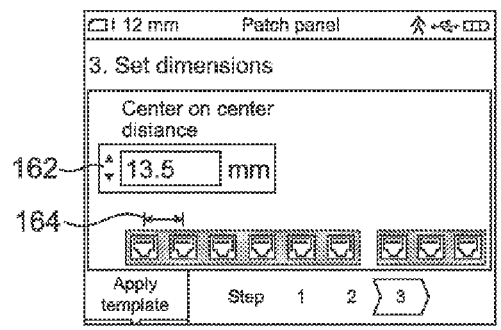

In FIG. 15 the user has modified the center on center distance from 12.5 mm to 13.5 mm. This modification is also visually displayed at region 164 such that the user can immediately visually verify if his modification corresponds with his intention.

Figure 16:
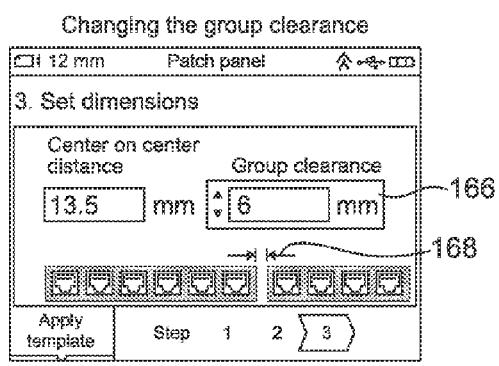

FIG. 16 shows how the user can change the "group clearance". In region 166 of the display the group clearance is clearly shown as currently set at 6 mm. This can again be modified using the up and down arrows or by entering a number on the keyboard. The group clearance is also visually represented at region 168 of the display.

Figure 17:
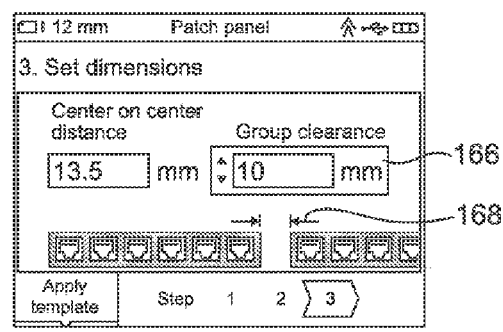

In FIG. 17 the user increased the group clearance from 6 mm to 10 mm. This modification is visually represented at region 168 of the display such that the user can again immediately visually verify if his modification corresponds with his intention.

FIGS. 18 to 37 show an alternative user interface flow for creating a patch panel label.

Figure 18:
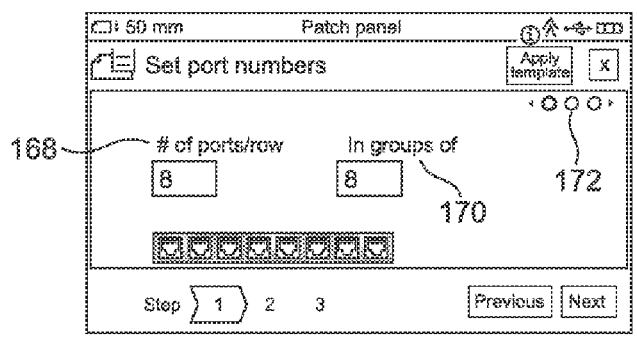
FIGS. 18 to 37 show a user interface flow for the creation of a patch panel, according to another embodiment.

FIG. 18 shows the first step of the patch panel label creation process. In this figure the number of ports/rows is set at 8 as shown at region 168, with 8 ports per group as shown at region 170 of the display. Region 172 of the display shows that the user is at step 1 of 3 of the label creation process as visually displayed by the shaded circle.

Figure 19:
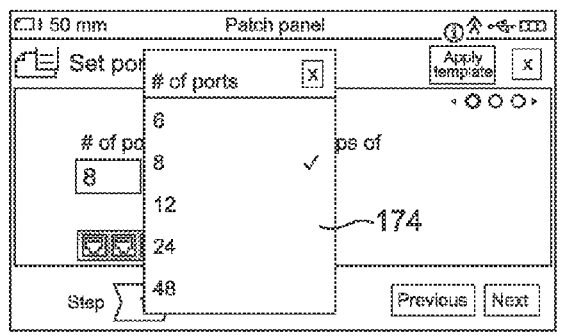

In FIG. 19 the user is modifying the number of ports/row. The user can do this by using drop down list 174 which is provided.

Figure 20:
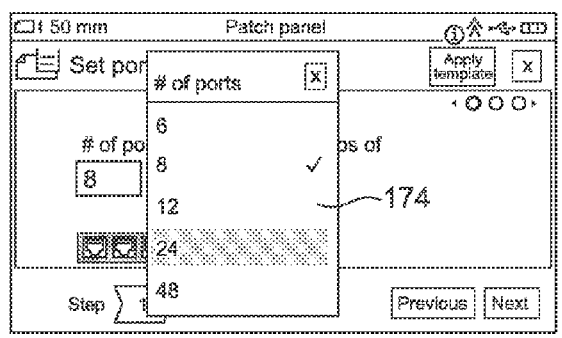
Figure 21:
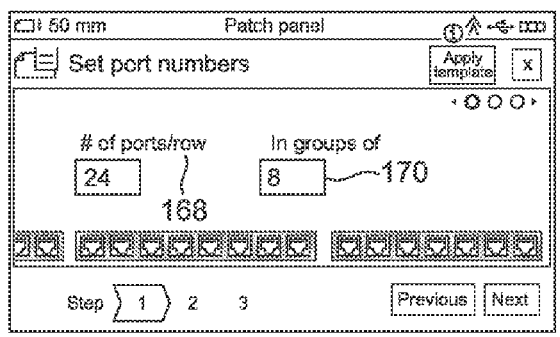
Figure 22:
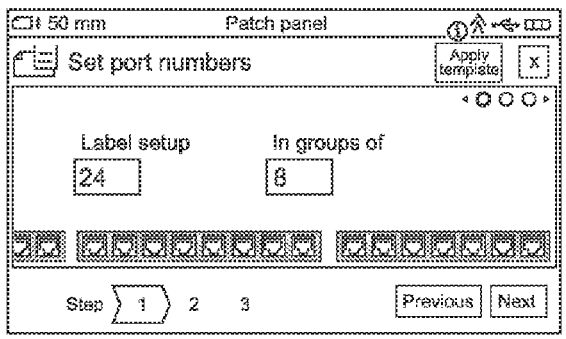

As shown in FIG. 20 the user has now selected 24 ports as shown at region 174. This selection is confirmed in FIG. 21 which shows 24 ports/row at region 168. These ports remain in groups of 8 as shown at region 170.

Figure 23:
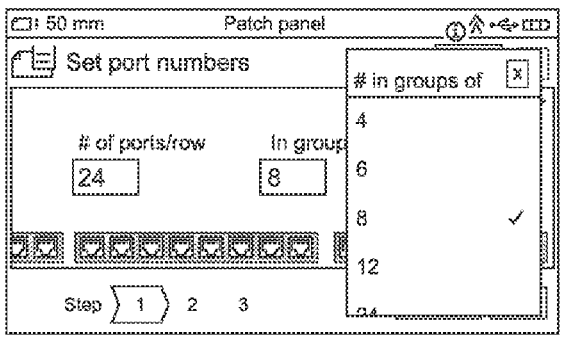
Figure 24:
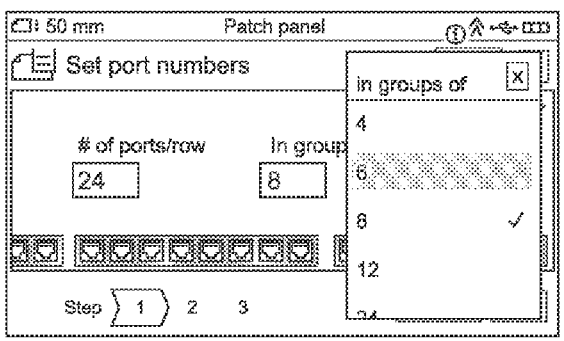
Figure 25:
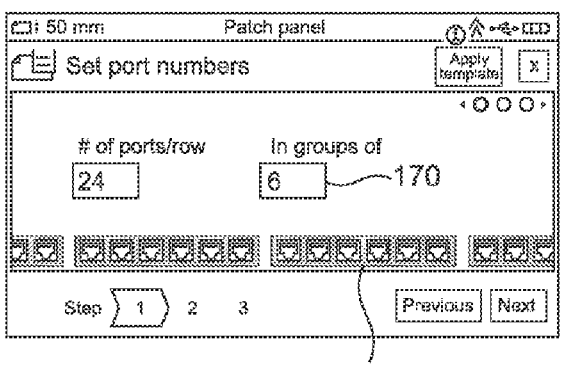

FIG. 23 shows how the port grouping can be changed. This is again done using a drop down list 176. As shown in FIG. 24 the user is about to change the number of ports per group from 8 to 6. This selection is confirmed at region 170 in FIG. 25. Region 172 also visually represents that there are 6 ports per group.

Figure 26:
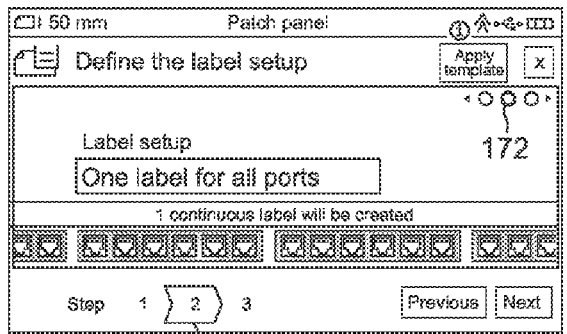
Figure 27:
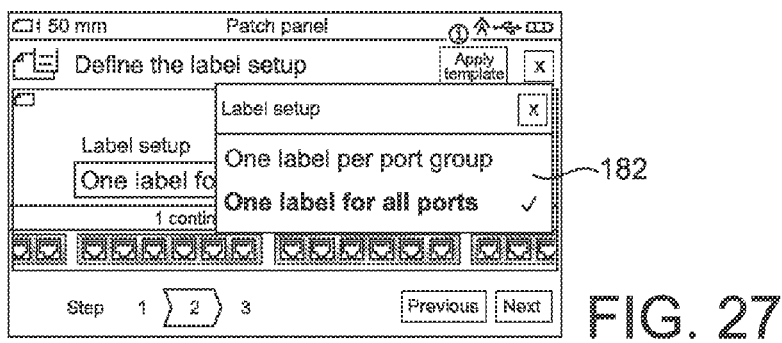
Figure 28:
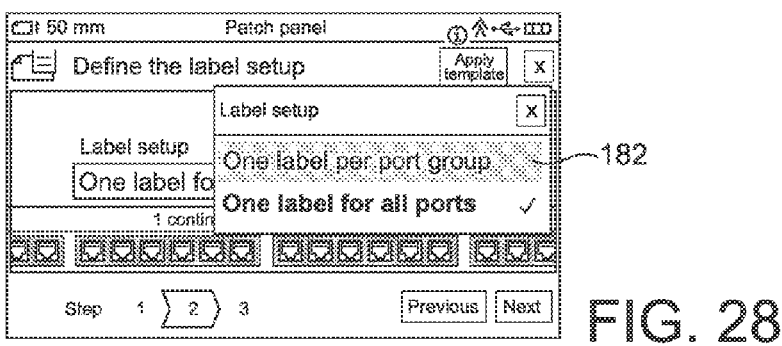
Figure 29:
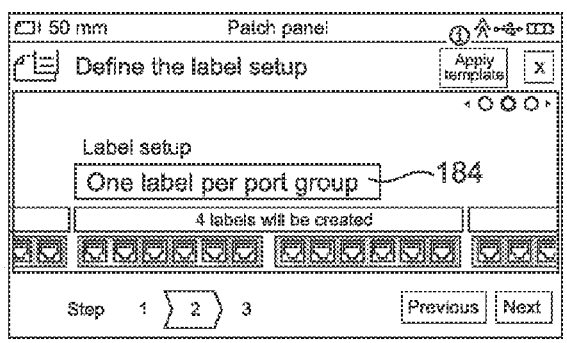

In FIG. 26 the user has moved on to step 2 of the label creation process as represented by region 172 and region 180 of the display. At this step the user can define the label setup. As shown at FIGS. 27 and 28 the user can use drop down list 182 to select between "one label per port group" and "one label for all ports". As show in FIG. 29 the user has selected one label per port group, as confirmed at region 184 of the display.

Figure 30:
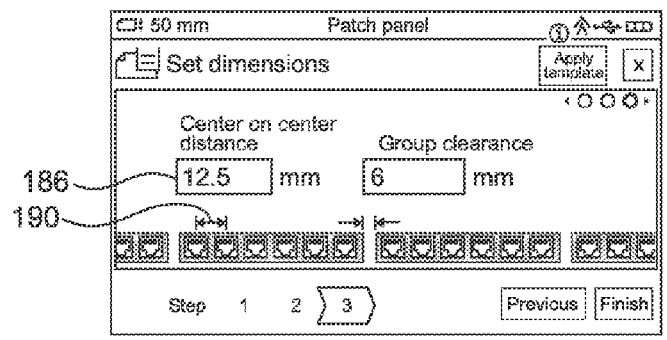
Figure 31:
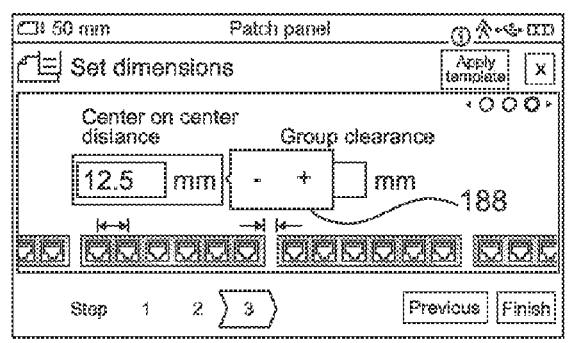

FIGS. 30 and 31 show how the user may change the center on center distance of the ports. The user may modify this dimension in region 186 of the display using + and − icons 188. The meaning of "center on center distance" is also visually represented at region 190 of the display.

Figure 32:
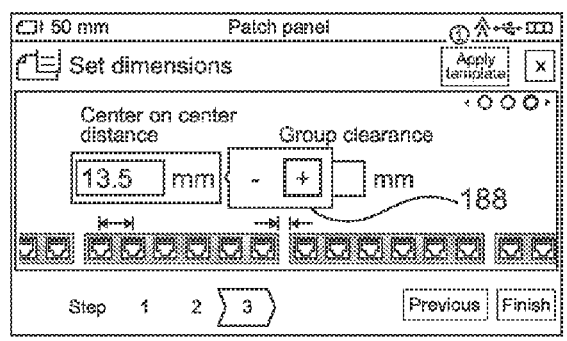
Figure 33:
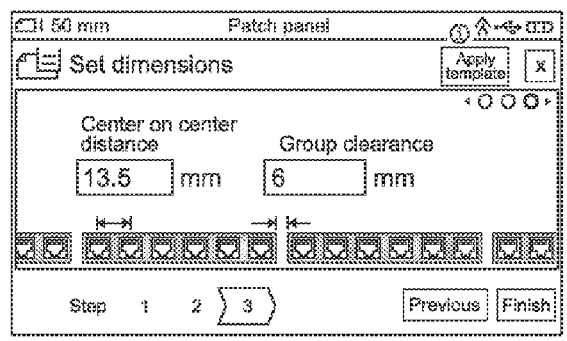
Figure 34:
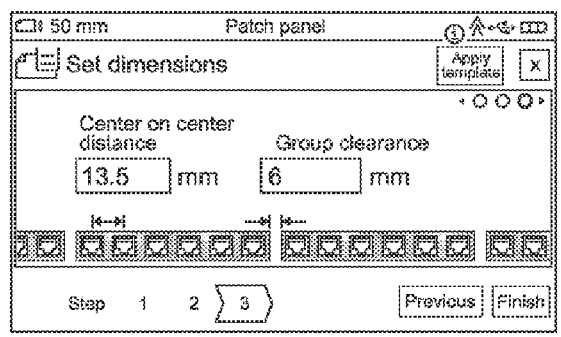

In FIG. 32 it is shown that the user has used the + icon in region 188 to increase the center on center distance from 12.5 mm to 13.5 mm. The visual representation of the parameter at region 190 illustrates the result of the increase.

Figure 35:
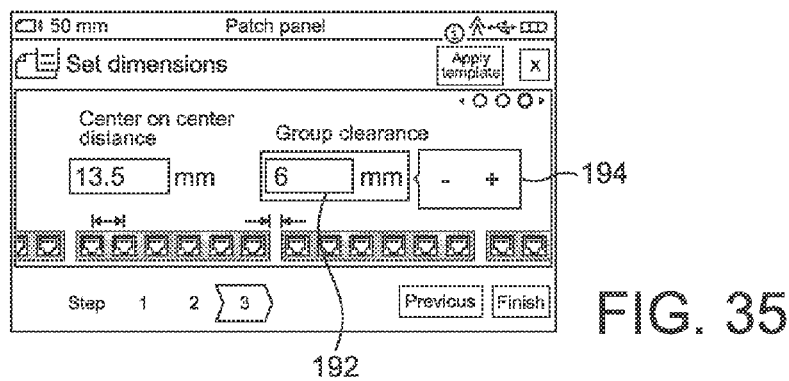
Figure 36:
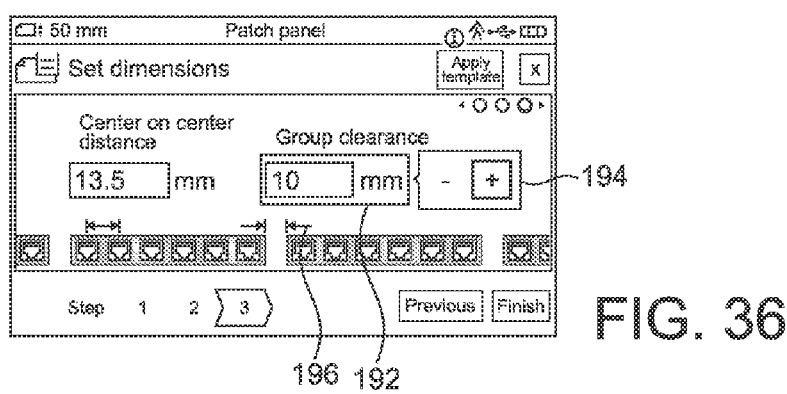

As shown in FIGS. 35 and 36 the user may also change the group clearance in region 192 using + and − icons 194.

In FIG. 36 it is shown that the user has increased the group clearance from 6 mm to 10 mm. The meaning of "group clearance" is visually represented at region 196 of the display. Further, any change of the parameter is immediately reflected in this visual representation.

Figure 37:
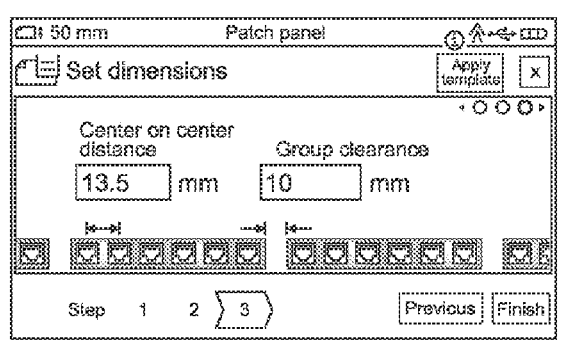

As shown in FIG. 37 the user can also finish the label creation process by clicking the "finish" icon 200.

Figure 38:
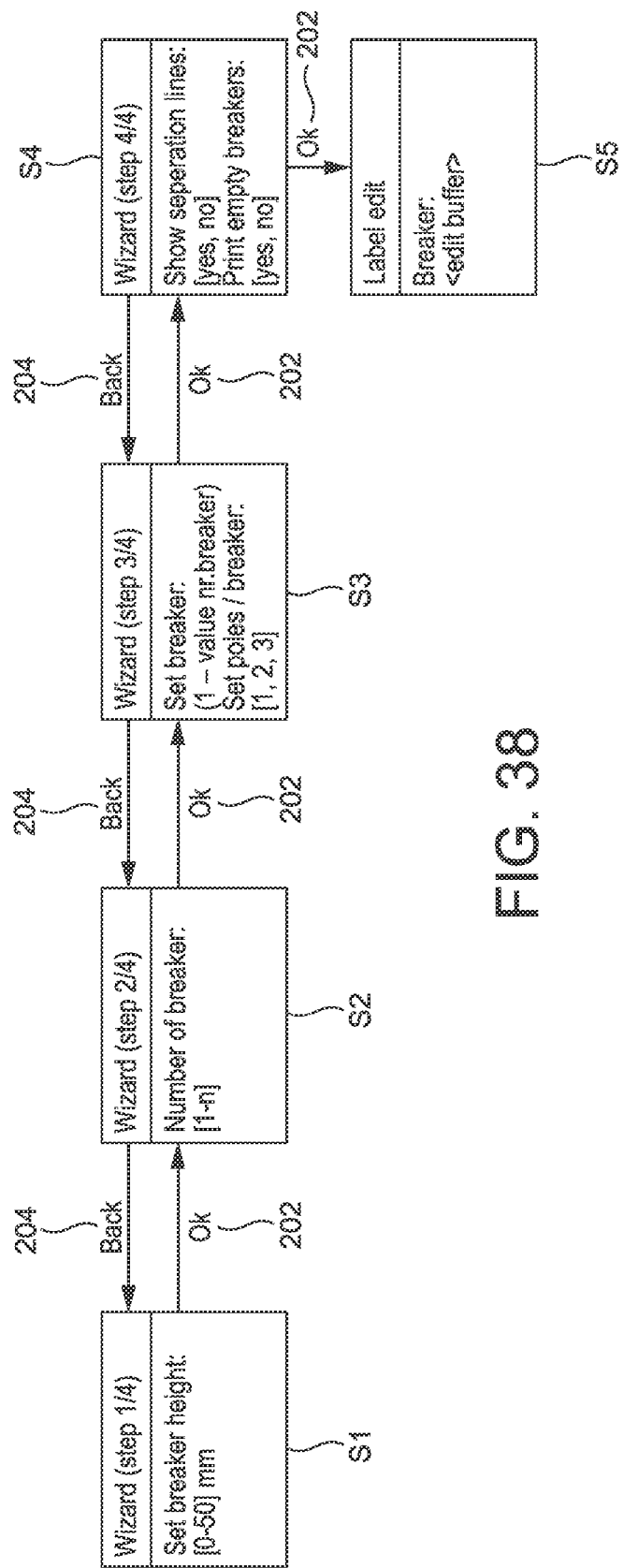
FIG. 38 is a schematic flow diagram showing the steps of creating a "breaker" label, according to one embodiment.

FIG. 38 is a schematic flow diagram showing the steps of creating a "breaker" label. At step S1 of the process the user sets the breaker height. At step S2 the user selects the number of breakers. At step S3 the user selects the type of breaker. At this step the user can set the number of poles. At step S4 the user selects whether to show separator lines between the breakers and also whether to print any empty breakers. At step S5 the user can go on to edit the selected type of breaker label. The user can move between any of these steps by selecting "ok" 202. As represented at 204 the user can also move "back" to any of the earlier steps.

The method employed by the described embodiments provides an intuitive and guided method in the creation of the label. That is, the user is automatically guided to the next step of the process. Whatever step the user is at, it relates to the type of label the user is creating. For example, if the user has selected that they want to create a cable wrap label, then the user will not be provided with any options that specifically relate to a patch panel label. At each step of the process the user is informed of what the particular step relates to, and also how far through the process the user is. The method thus provides a hierarchical menu structure which is particularly easy for a user to navigate through. Furthermore, the user may be provided with an on-screen visual representation of the feature they are adjusting. This makes it easy for the user to understand the adjustment they are making.

Figure 39:
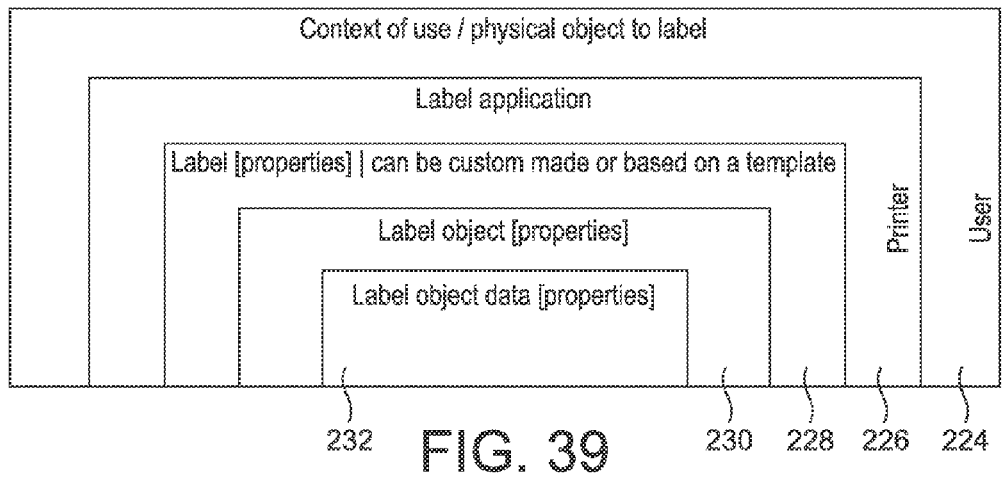
FIG. 39 shows a label hierarchy structure employed by certain embodiments.

A label hierarchy structure employed by certain embodiments is shown in FIG. 39. Each block of the structure of FIG. 39 represents a menu layer. In a top-most layer 224 of the menu the user selects the context of use of the label, or the physical object to label e.g. cable, patch-panel etc. Layer 226 of the menu enables the user to select the label application or label type. The label application defines specific labelling structures and therefore a number of requirements for the label to be created. At level 228 of the menu hierarchy, the label properties can be entered. These can be custom made or based on a template. The configuration of the label properties is defined by the label application. The parameters may vary, although basic label properties may include: label width, label height, number of cells, orientation (i.e. vertical or horizontal), and leader and trailer information. At level 230 of the menu hierarchy the user enters label object properties. At this level the user can populate the label with a number of objects, including but not limited to: text, barcode, image, layout element. The label objects which can be added to a label depend on the label application. The options for manipulation (e.g. resize and rotate) of the label objects depends on the label application and configuration of the label. At layer 232 of the menu hierarchy the user is enabled to enter label object data properties, for example font and font size. The data which can be added depends on the type of label object. The type of label object also determines the data formatting options, which is also determined by the label application.

At each layer of the menu the user is enabled to enter information relevant to that layer. Furthermore, only options relevant to the label application (or label type) that has been selected, and/or relevant to an option that has been entered in a previous menu layer, are displayed to the user. Therefore at any one time the user is only presented with relevant information to create a desired label.

This structure allows for progressive disclosure of functionalities leading to a better understanding of the label creation process and increased learnability for the end-user. This structure and the way that the functionalities are progressively disclosed allows editing on an object level and creates a direct link between the objects and possibilities for manipulation of the object. Object-based editing has at least the following advantages: increased user understanding of editing possibilities; reducing choice at certain levels of the hierarchy therefore speeding up the user's selection process, thus helping in the decision making process, and reducing error rate; and also the provision of an augmented perception of simplicity. For example, for devices with a hardware keyboard (e.g. a stand-alone label printer), the number of keys can be limited because the various functionalities are shown to the user only when relevant.

The icons referred to in the preceding figures, such as selectable icons 104, 106, 108, 109, 112, 114, 116, 118, 120, and 122 in FIG. 5 may be referred to as "dynamic direct access keys". The dynamic direct access keys displayed to a user at any one time may be dependent on a number of features, such as an option previously selected, availability of a label cassette, whether a user is currently editing a label etc.

The term "dynamic direct access key" is one example of a term that may be used to denote such keys. A feature of such keys is that they may enable direct access to a feature or functionality of the label printer when pressed. This may provide a shortcut to avoid one or more of the menus and/or one or more steps.

Figure 40A:
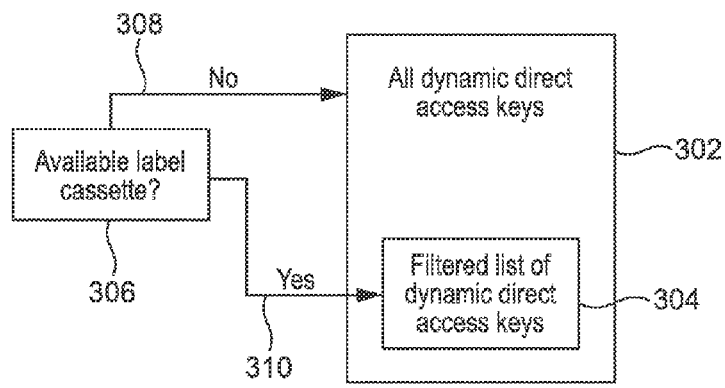
FIGS. 40A and 40B schematically show the concept of dynamic direct access key selection according to one embodiment; and,
FIGS. 41 to 48 show embodiments of a graphical user interface which displays a preview of a label to be created in relation to a selected object type.
Figure 40B:
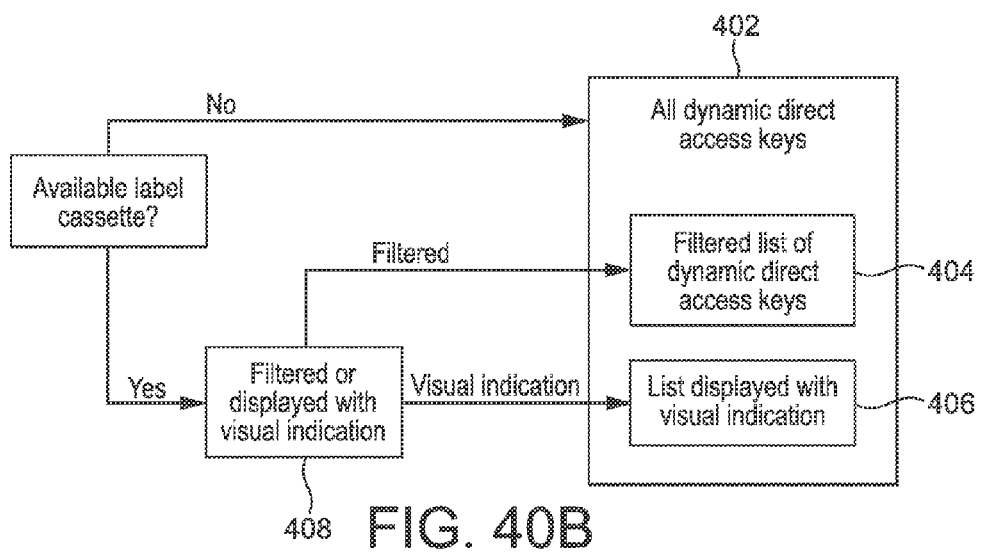

FIGS. 40A and 40B schematically show the concept of dynamic direct access keys, and how those dynamic direct access keys are made available to a user.

Referring to FIG. 40A, a full complement of dynamic direct access keys is schematically showing at 302. These are all the dynamic direct access keys that may possibly be made available to a user. In some embodiments not all dynamic direct access keys are available to a user at any one time. That is in some situations a filtered list of dynamic direct access keys 304 may be made available to a user. As shown in FIG. 40A whether or not all dynamic direct access keys are made available may be dependent upon the availability of a label cassette as shown at 306. For example if as shown at 308 there is no available label cassette present then all dynamic direct access keys are displayed. If on the other hand a label cassette is available and inserted into the label printer as shown at 310 then a filtered list 304 of dynamic direct access keys is shown to a user. For example the filtered list will be a list of dynamic direct access keys that are relevant to the type of label cassette inserted into the printer.

FIG. 40B shows the concept of dynamic direct access keys according to another embodiment. In this Figure the list of all dynamic direct access keys is shown schematically at 402. The filtered list of dynamic direct access keys is shown schematically at 404. A list of dynamic direct access keys that are displayed with a visual indication is represented at 406. For example the dynamic direct access keys in the list 406 may be associated with a visual indication such as an exclamation mark (!) or a question mark (?), such as the exclamation mark shown in FIG. 5. As with FIG. 40A, if there is no available label cassette then all dynamic direct access keys are displayed. If on the other hand a label cassette is available then a decision is made at 408 whether to show a filtered list of dynamic direct access keys 404 or whether to provide a list of dynamic direct access keys with a visual indication as to the status of those access keys 406. For example the filtered list may only show those dynamic direct access keys that are available for the type of label cassette that has been inserted. The list displayed with a visual indication 406 may use a visual indication such as an exclamation mark or a question mark to visually indicate those dynamic direct access keys that are not available for the type of label cassette inserted.

The menu and user interface structure described above leads the user through the label-creating process. By showing the user, in certain embodiments, relevant options only for the particular stage of the label-creating process, then use of available display space can be maximised. This is particularly useful for stand-alone label printers where the display may be relatively compact. Also, in certain embodiments, by displaying to the user relevant options only, or highlighting the relevant options, then the amount of time taken for a user to create a label is reduced since it will take the user less time to navigate through the on-screen menus.

In some embodiments, once the user is at the label editing stage the display 610 shows a preview of the label in relation to a selected object type. This is shown for example in FIGS. 41 to 48.

Figure 41:
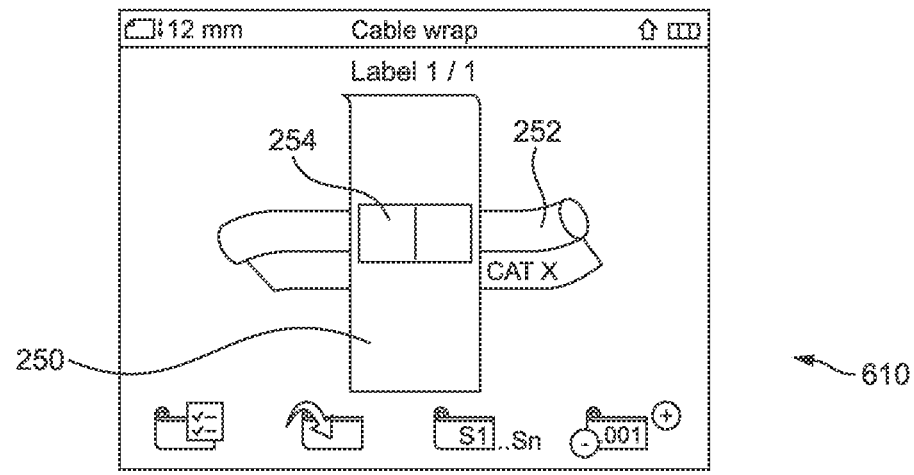

In FIG. 41 the user is editing a label 250. The user has already selected "cable wrap" as the label type. The user is now presented on the display 610 with a preview of the label 250 and a preview of the cable 252. To get to this stage the user may have already inputted data related to the label and object, such as the label width and the dimensions of the object. For example the label properties may have been automatically detected by the label printing apparatus upon insertion of a label cassette. The object properties may also have been captured in another way, such as uploading a photograph of the object to the label printing apparatus or external apparatus to which the label printing apparatus is connected. A cursor 254 shows where the text will be displayed once it has been entered by the user. This provides the user with a very accurate representation of how the label 250 will look in relation to the object 252.

Figure 42:
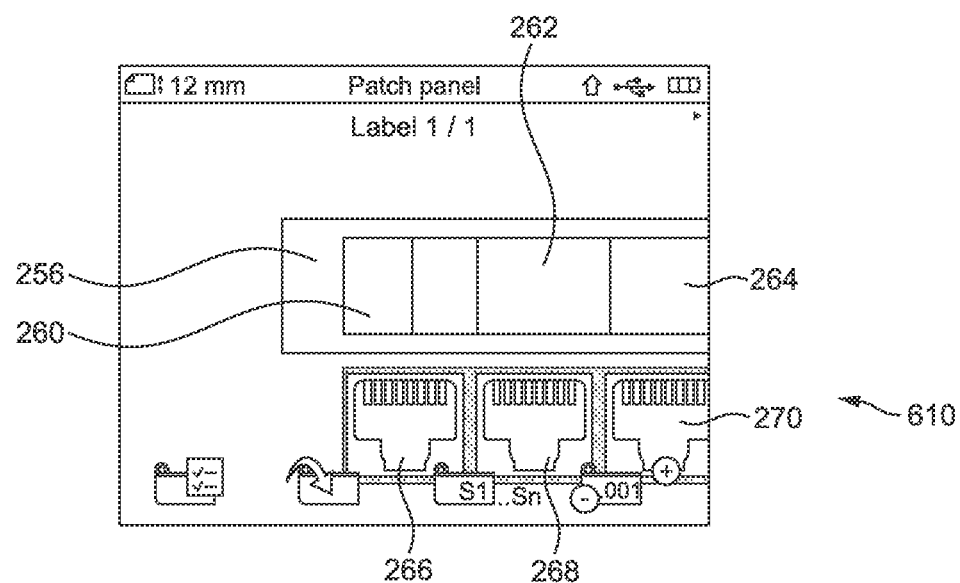

FIG. 42 shows the same principle but in relation to a patch panel label. The label 256 is shown next to a representation of a patch panel 258. In this example the user is clearly shown how the sections 260, 262 and 264 of the label line up relative to respective ports 266, 268 and 270 of the patch panel 258. Again, the user is provided with an accurate representation of how the label 256 will look when applied to the object, in this case patch panel 258.

FIGS. 43 to 48 show this principle in relation to different objects.

Figure 43:
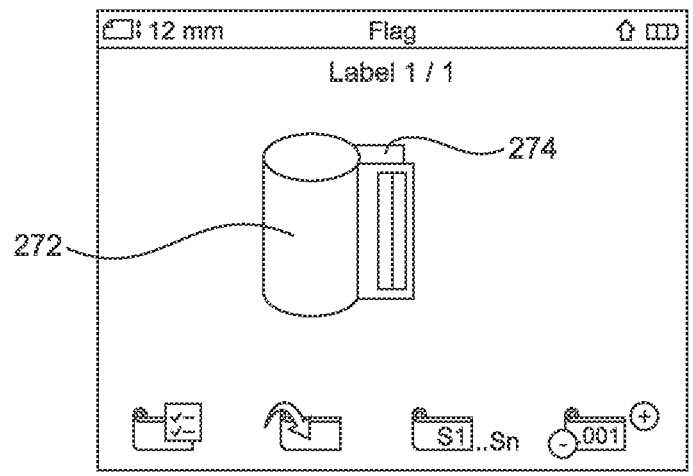

FIG. 43 shows a flag label 272 including a flag portion 274. As the user enters text the flag portion 274 will extend so as to accommodate the entered text. Alternatively, the flag label 272 could be displayed in relation to a cable which the flag label could be applied to.

Figure 44:
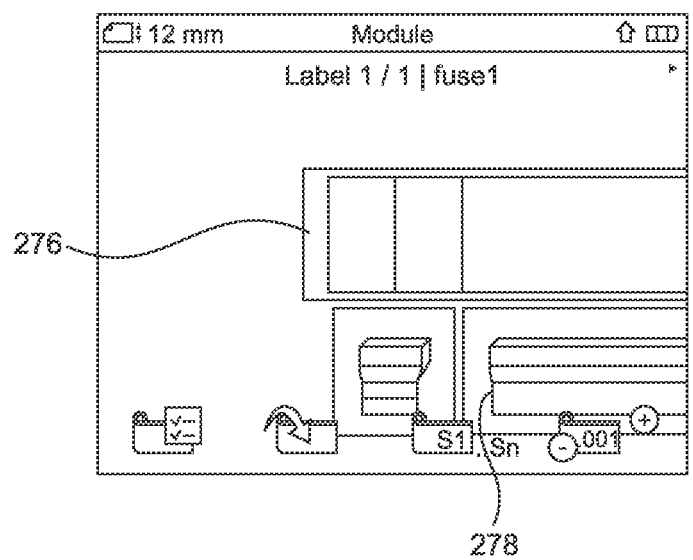

FIG. 44 shows a representation of a label 276 in relation to a fuse-box 278.

Figure 45:
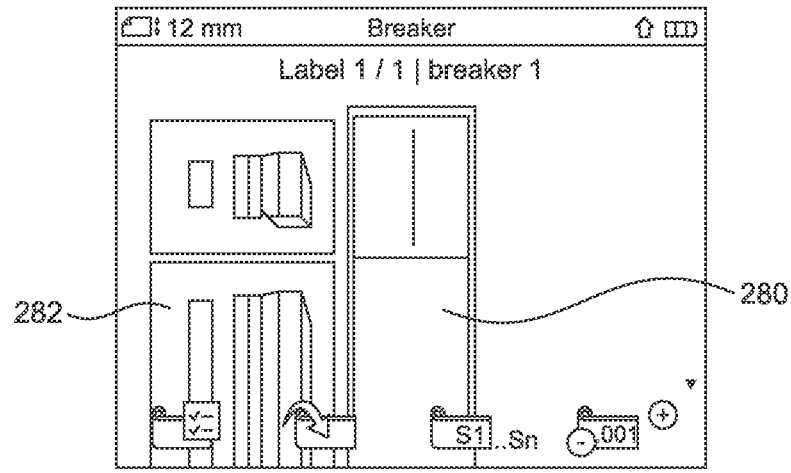

FIG. 45 shows a representation of a label 280 next to a representation of a breaker-box 282.

Figure 46:
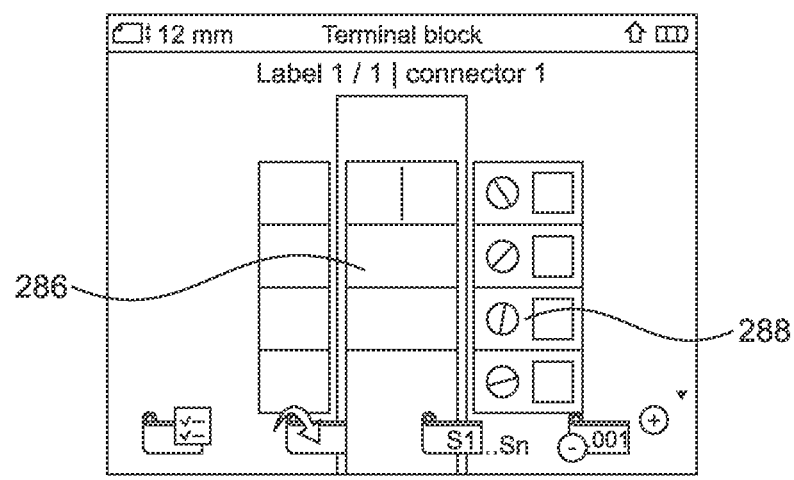

FIG. 46 shows a representation of a label 284 next to a representation of a terminal block 288.

Figure 47:
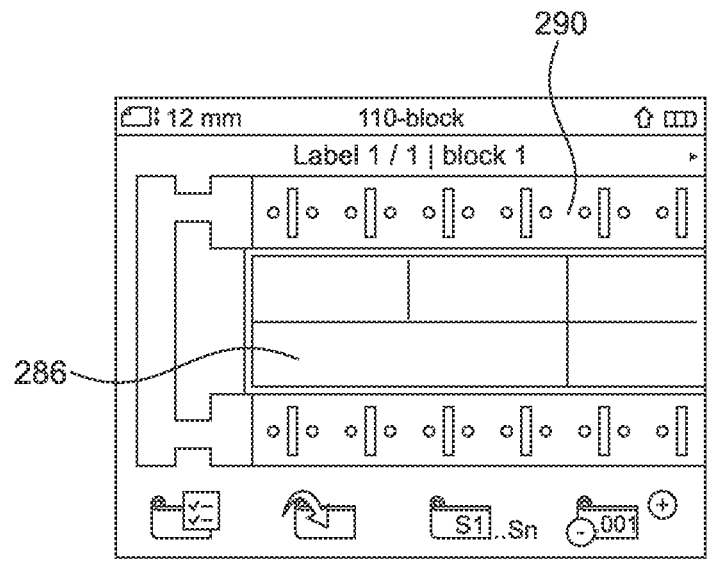

FIG. 47 shows a representation of a label 288 next to a representation of a 110-block 290.

Figure 48:
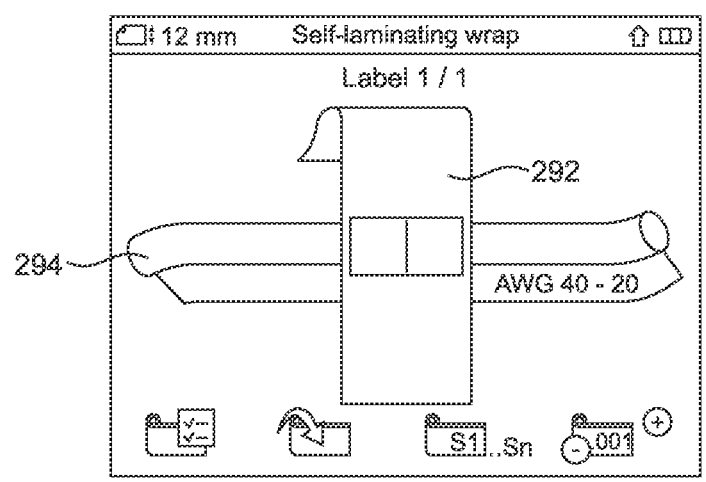

FIG. 48 shows a representation of a label 292 next to a representation of a cable 294.

In all of these cases the user is provided with an accurate visual representation of their label next to the object to which the label is to be applied. In some embodiments any label edits will be displayed on the display 610 in real time. Therefore the user will be able to make adjustments as necessary to the label and will be able to see how the label looks relative to the object to which it is to be applied. This provides a user-friendly label-creating experience, and gives the user an accurate preview of how the label will look when it is applied to the selected object.

The ways in which a user can navigate through the menus and user interfaces discussed above are various. For example, the user may operate keys on a hardware keyboard of the label printing apparatus to navigate around the display 610. Where the label printing apparatus is connected to an external apparatus such as a PC, the user may use other input means such as a mouse or tracker-pad. Alternatively, where the label printing apparatus has a touch-screen, the user may navigate through the display by directly touching the display.

The skilled person would appreciate that any of the methods described herein may be implemented using a computer program embodied on a computer readable medium (such as a CDROM or memory within a stand-alone printer) for controlling a controller (or other similar apparatus as discussed above.

Embodiments may be used with continuous tape or die cut labels. Die cut labels are provided on a continuous backing layer but are discrete, pre-cut labels. The tape or die cut labels may be provided in a cassette or simply on a roll.

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

The invention claimed is:

1. A method of creating a label to be printed by a label printing apparatus, the method comprising:
   displaying on a display a plurality of selectable options, each option being associated with a respective label type of a plurality of label types for a label to be created;

in response to detection of a selection of one of said options by a user, displaying, in a first parameter input layer, at least one first adjustable parameter associated with the label of the selected type; and in response to detection of completion of the first input layer, displaying, in a second parameter input layer, at least one further adjustable parameter associated with the label of the selected type, the at least one further adjustable parameter being different from the first adjustable parameter; and receiving at least one of a save command for the label or a print command for the label.

2. A method as set forth in claim 1, comprising preventing the user from accessing the second parameter input layer until the first parameter input layer has been completed.

3. A method as set forth in claim 1, wherein the displaying the first parameter input layer comprises displaying a first input screen of a user interface display, and displaying the second parameter input layer comprises displaying a second input screen of the user interface display different from the first input screen.

4. A method as set forth in claim 1, wherein the method comprises making available as the at least one first adjustable parameter and the at least one further adjustable parameter only parameters that are relevant to the selected label type.

5. A method as set forth in claim 1, wherein the method comprises providing, at each layer, information comprising an explanation of an objective of the respective layer.

6. A method as set forth in claim 1, wherein the method comprises an indication of user progress through the method of creating a label.

7. A method as set forth in claim 6, wherein the indication of user progress comprises an indication of a total number of layers, and an indication of which layer in the total number of layers the user is operating.

8. A method as set forth in claim 1, wherein the method comprises providing a visual representation that is representative of the parameter being adjusted at the respective layer.

9. A method as set forth in claim 8, wherein the method comprises updating the visual representation in real-time as the parameter is adjusted.

10. A method as set forth in claim 1, wherein the method comprises displaying one or more further parameter input layers, each further parameter input layer having a respective at least one further adjustable parameter.

11. A method as set forth in claim 1, wherein the plurality of label types comprise at least one of: a terminal block label type; a patch panel label type; a flag label type; a die-cut label type; a fixed-length label type; a 110-block label type; a cable wrap label type, a heat-shrink tubing label type; a self-laminating cable label type; a fuse box label type; a quick label type; a breaker box label type; a distribution panel label type; and a module type.

12. A method as set forth in claim 1, wherein the at least one first adjustable parameter or the at least one further adjustable parameter comprises at least one of: a number of ports per group of a patch panel label; a number of labels per group of a patch panel label; a center on center distance of a patch panel label; a group clearance between groups in a patch panel label; a number of breakers of a breaker label; and a number of poles of a breaker label.

13. An apparatus comprising:
at least one processor;
and at least one memory;
the at least one processor and the at least one memory being arranged to cause the apparatus at least to:
display on a display of the apparatus a plurality of selectable options, each option being associated with a respective label type of a plurality of label types for a label to be created;
in response to detection of a selection of one of said options by a user, display, in a first parameter input layer, at least one first adjustable parameter associated with the label of the selected type; and
in response to detection of completion of the first input layer, display, in a second parameter input layer, at least one further adjustable parameter associated with the label of the selected type, the at least one further adjustable parameter being different from the first adjustable parameter; and
receive at least one of a save command for the label or a print command for the label.

14. An apparatus as set forth in claim 13, the at least one processor and the at least one memory being arranged to cause the apparatus at least to prevent the user accessing the second parameter input layer until the first parameter input layer has been completed.

15. An apparatus as set forth in claim 13, wherein the displaying the first parameter input layer comprises displaying a first input screen of a user interface display, and displaying the second parameter input layer comprises displaying a second input screen of the user interface display different from the first input screen.

16. An apparatus as set forth in claim 13, the at least one processor and the at least one memory being arranged to cause the apparatus at least to make available as the at least one first adjustable parameter and the at least one further adjustable parameter only parameters that are relevant to the selected label type.

17. An apparatus as set forth in claim 13, the at least one processor and the at least one memory being arranged to cause the apparatus at least to provide, at each layer, information comprising an explanation of an objective of the respective layer.

18. An apparatus as set forth in claim 13, the at least one processor and the at least one memory being arranged to cause the apparatus at least to provide an indication of user progress through the method of creating a label.

19. An apparatus as set forth in claim 13, wherein the at least one first adjustable parameter or the at least one further adjustable parameter comprises at least one of: a number of ports per group of a patch panel label; a number of labels per group of a patch panel label; a center on center distance of a patch panel label; a group clearance between groups in a patch panel label; a number of breakers of a breaker label; and a number of poles of a breaker label.

20. A non-transitory computer readable medium comprising code means adapted to perform a method comprising:
displaying on a display a plurality of selectable options, each option being associated with a respective label type of a plurality of label types for a label to be created;
in response to detection of a selection of one of said options by a user, displaying, in a first parameter input layer, at least one first adjustable parameter associated with the label of the selected type; and
in response to detection of completion of the first input layer, displaying, in a second parameter input layer, at least one further adjustable parameter associated with the label of the selected type, the at least one further adjustable parameter being different from the first adjustable parameter; and receiving at least one of a save command for the label or a print command for the label.

* * * * *